United States Patent
Silverbrook et al.

(10) Patent No.: US 7,469,982 B2
(45) Date of Patent: Dec. 30, 2008

(54) TELESCOPE ASSEMBLY WITH IMAGE CAPTURE AND PRINTING DEVICES

(75) Inventors: Kia Silverbrook, Balmain (AU); Janette Faye Lee, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 306 days.

(21) Appl. No.: 11/503,078

(22) Filed: Aug. 14, 2006

(65) Prior Publication Data

US 2006/0274092 A1   Dec. 7, 2006

Related U.S. Application Data

(63) Continuation of application No. 10/510,090, filed as application No. PCT/AU03/00161 on Feb. 12, 2003, now Pat. No. 7,137,678.

(30) Foreign Application Priority Data

Apr. 16, 2002   (AU) .................................... PS1752

(51) Int. Cl.
*B41J 3/36* (2006.01)
(52) U.S. Cl. .......................................................... 347/2

(58) Field of Classification Search ...................... 347/2; 359/399

See application file for complete search history.

(56) References Cited

U.S. PATENT DOCUMENTS

| | | | |
|---|---|---|---|
| 5,847,836 A | 12/1998 | Suzuki | |
| 6,305,770 B1 | 10/2001 | Silverbrook | |
| 6,357,135 B1 | 3/2002 | Silverbrook | |
| 2005/0275691 A1 | 12/2005 | Silverbrook | |

FOREIGN PATENT DOCUMENTS

| | | |
|---|---|---|
| WO | WO 99/04368 A1 | 1/1999 |
| WO | WO 02/056757 | 7/2002 |

*Primary Examiner*—Huan H Tran

(57) ABSTRACT

A portable telescope assembly includes a telescope having a body that at least partially defines a printer body. An image sensor is mounted in the telescope and is configured to capture images from a lens of the telescope. An internal printer is mounted in the printer body and is operatively connected to the image sensor to print the captured images on print media. A media transport and cutting device is operatively arranged with respect to the internal printer. Controllers are mounted in the telescope and are configured to control the operation of the image sensor and the printer.

6 Claims, 11 Drawing Sheets

TELESCOPE ASSEMBLY WITH IMAGE CAPTURE AND PRINTING DEVICES

CROSS REFERENCE TO RELATED APPLICATIONS

The present application is Continuation Application of U.S. patent application Ser. No. 10/510,090 filed on Oct. 5, 2004, now issued U.S. Pat. No. 7,137,678, which is a 371 of PCT/AU03/00161 filed on Feb. 12, 2003, all of which is herein incorporated by reference.

FIELD OF THE INVENTION

The following invention relates to a device having an in-built image sensor and an internal print engine, and, more particularly, to a telescope having an internal printer.

BACKGROUND OF INVENTION

Conventional telescopes include a lens or sequence of lenses and an eyepiece through which a person can view a remote object. It is known to attach a camera to a telescope in order to take a photograph of a remote object Moreover, it would be beneficial for amateur astronomers, bird watchers, mariners and any other person wishing to use a telescope if a permanent printed record of what has been viewed could be made, instantaneously and inexpensively.

CO-PENDING APPLICATIONS

Various methods, systems and apparatus relating to the present invention are disclosed in the following co-pending applications filed by the applicant or assignee of the present invention simultaneously with the present application:

| | | |
|---|---|---|
| PCT/AU03/00154 | PCT/AU03/00151 | PCT/AU03/00150 |
| PCT/AU03/00145 | PCT/AU03/00153 | PCT/AU03/00152 |
| PCT/AU03/00168 | PCT/AU03/00169 | PCT/AU03/00170 |
| PCT/AU03/00162 | PCT/AU03/00146 | PCT/AU03/00159 |
| PCT/AU03/00171 | PCT/AU03/00149 | PCT/AU03/00167 |
| PCT/AU03/00158 | PCT/AU03/00147 | PCT/AU03/00166 |
| PCT/AU03/00164 | PCT/AU03/00163 | PCT/AU03/00165 |
| PGT/AU03/00160 | PCT/AU03/00157 | PCT/AU03/00148 |
| PCT/AU03/00156 | PCT/AU03/00155 | |

The disclosures of these co-pending applications are incorporated herein by cross-reference.

RELATED PATENT APPLICATIONS AND PATENTS

| | | | |
|---|---|---|---|
| U.S. Pat No. 6,227,652 | U.S. Pat No. 6,213,588 | U.S. Pat No. 6,213,589 | U.S. Pat No. 6,231,163 |
| U.S. Pat No. 6,247,795 | U.S. Pat No. 6,394,581 | U.S. Pat No. 6,244,691 | U.S. Pat No. 6,257,704 |
| U.S. Pat No. 6,416,168 | U.S. Pat No. 6,220,694 | U.S. Pat No. 6,257,705 | U.S. Pat No. 6,247,794 |
| U.S. Pat No. 6,234,610 | U.S. Pat No. 6,247,793 | U.S. Pat No. 6,264,306 | U.S. Pat No. 6,241,342 |
| U.S. Pat No. 6,247,792 | U.S. Pat No. 6,264,307 | U.S. Pat No. 6,254,220 | U.S. Pat No. 6,234,611 |
| U.S. Pat No. 6,302,528 | U.S. Pat No. 6,283,582 | U.S. Pat No. 6,239,821 | U.S. Pat No. 6,338,547 |
| U.S. Pat No. 6,247,796 | U.S. Pat No. 6,557,977 | U.S. Pat No. 6,390,603 | U.S. Pat No. 6,362,843 |
| U.S. Pat No. 6,293,653 | U.S. Pat No. 6,312,107 | U.S. Pat No. 6,227,653 | U.S. Pat No. 6,234,609 |
| U.S. Pat No. 6,238,040 | U.S. Pat No. 6,188,415 | U.S. Pat No. 6,227,654 | U.S. Pat No. 6,209,989 |
| U.S. Pat No. 6,247,791 | U.S. Pat No. 6,336,710 | U.S. Pat No. 6,217,153 | U.S. Pat No. 6,416,167 |
| U.S. Pat No. 6,243,113 | U.S. Pat No. 6,283,581 | U.S. Pat No. 6,247,790 | U.S. Pat No. 6,260,953 |
| U.S. Pat No. 6,267,469 | U.S. Pat No. 6,273,544 | U.S. Pat No. 6,309,048 | U.S. Pat No. 6,420,196 |
| U.S. Pat No. 6,443,558 | U.S. Pat No. 6,439,689 | U.S. Pat No. 6,378,989 | U.S. Pat No. 6,848,181 |
| U.S. Pat No. 6,634,735 | U.S. Pat No. 6,755,513 | U.S. Pat No. 6,409,323 | U.S. Pat No. 6,281,912 |
| U.S. Pat No. 6,604,810 | U.S. Pat No. 6,318,920 | U.S. Pat No. 6,488,422 | U.S. Pat No. 6,655,786 |
| U.S. Pat No. 6,457,810 | U.S. Pat No. 6,485,135 | U.S. Pat No. 6,566,858 | U.S. Pat No. 6,331,946 |
| U.S. Pat No. 6,246,970 | U.S. Pat No. 6,442,525 | U.S. Pat No. 09/505,951 | U.S. Pat No. 6,816,968 |
| U.S. Pat No. 6,757,832 | U.S. Pat No. 6,795,215 | U.S. Pat No. 09/575,109 | U.S. Pat No. 6,859,289 |
| U.S. Pat No. 6,977,751 | U.S. Pat No. 6,398,332 | U.S. Pat No. 6,394,573 | U.S. Pat No. 6,622,923 |
| U.S. Pat No. 6,238,044 | U.S. Pat No. 6,425,661 | U.S. Pat No. 6,390,605 | U.S. Pat No. 6,322,195 |
| U.S. Pat No. 6,612,110 | U.S. Pat No. 6,480,089 | U.S. Pat No. 6,460,778 | U.S. Pat No. 6,305,788 |
| U.S. Pat No. 6,426,014 | U.S. Pat No. 6,364,453 | U.S. Pat No. 6,457,795 | U.S. Pat No. 6,595,624 |
| U.S. Pat No. 6,315,399 | U.S. Pat No. 6,338,548 | U.S. Pat No. 6,540,319 | U.S. Pat No. 6,328,431 |
| U.S. Pat No. 6,328,425 | U.S. Pat No. 6,991,320 | U.S. Pat No. 6,383,833 | U.S. Pat No. 6,464,332 |
| U.S. Pat No. 6,390,591 | U.S. Pat No. 7,018,016 | U.S. Pat No. 6,328,417 | U.S. Pat No. 6,322,194 |
| U.S. Pat No. 6,382,779 | U.S. Pat No. 6,629,745 | U.S. Pat No. 6,417,757 | U.S. Pat No. 7,075,677 |
| U.S. Pat No. 6,428,139 | U.S. Pat No. 6,575,549 | U.S. Pat No. 09/693,079 | U.S. Pat No. 6,854,825 |
| U.S. Pat No. 6,428,142 | U.S. Pat No. 6,565,193 | U.S. Pat No. 6,609,786 | U.S. Pat No. 6,609,787 |
| U.S. Pat No. 6,439,908 | U.S. Pat No. 6,684,503 | PCT/AU98/00550 | PCT/AU00/00516 |
| PCT/AU00/00517 | PCT/AU00/00511 | PCT/AU00/00754 | PCT/AU00/00755 |
| PCTIAU00/00756 | PCT/AU00/00757 | PCT/AU00/00095 | PCT/AU00/00172 |
| PCT/AU00/00338 | PCT/AU00/00339 | PCT/AU00/00340 | PCT/AU00/00341 |
| PCT/AU00/00581 | PCT/AU00/00580 | PCT/AU00/00582 | PCT/AU00/00587 |
| PCT/AU00/00588 | PCT/AU00/00589 | PCT/AU00/00583 | PCT/AU00/00593 |
| PCT/AU00/00590 | PCT/AU00/00591 | PCT/AU00/00592 | PCT/AU00/00584 |
| PCT/AU00/00585 | PCT/AU00/00586 | PCT/AU00/00749 | PCT/AU00/00750 |
| PCT/AU00/00751 | PCT/AU00/00752 | PCT/AU01/01332 | PCT/AU01/01318 |
| PCT/AU00/01513 | PCT/AU00/01514 | PCT/AU00/01515 | PCT/AU00/01516 |
| PCT/AU00/01517 | PCT/AU00/01512 | PCT/AU01/00502 | PCT/AU02/01120 |
| PCT/AU00/00333 | PCT/AU01/00141 | PCT/AU01/00139 | PCT/AU01/00140 |
| PCT/AU00/00753 | PCT/AU01/01321 | PCT/AU01/01322 | PCT/AU01/01323 |
| PCT/AU00/00594 | PCT/AU00/00595 | PCT/AU00/00596 | PCT/AU00/00597 |
| PCT/AU00/00598 | PCT/AU00/00741 | PCT/AU00/00742 | |

DISCLOSURE OF THE INVENTION

In accordance with the invention, there is provided a telescope having a built-in printer for printing a graphic image corresponding to an optical image received optically by the telescope.

Preferably, the telescope includes an image sensor for sensing the optical image and converting it to image data, and a print engine controller for receiving the image data and controlling a printhead to print the graphic data based on the image data.

In a preferred embodiment, the telescope includes:

a micro-control circuit operatively connected to the print engine controller to control a motor driver for print media transportation; and a motor driver for operating a guillotine motor to sever a printed image from a roller of print media.

Preferably, the telescope includes image memory associated with the print engine controller.

It is also preferred that the telescope further include image enhancement circuitry for enhancing the image data prior to printing.

Preferably, the printhead is a pagewidth printhead, and more preferably is an inkjet printhead.

In a preferred embodiment, the printer includes a print engine assembly comprising first and second sub-assemblies, the first sub-assembly incorporating an ink source and print media, and the second sub-assembly incorporating a printhead.

In a preferred form, the telescope includes a longitudinal body through which passes at least some of the optical path of light entering the telescope, and a slot extending along the body through which the graphic image is, in use, dispensed.

In a particularly preferred embodiment, the printer includes a source of print media, configured such that the print media moves in a print path that is generally orbital about an axis of the body of the printer.

BRIEF DESCRIPTION OF THE DRAWINGS

A preferred and exemplary embodiment of the invention will now be described with reference to the accompanying drawings, in which.

DESCRIPTION OF THE PREFERRED EMBODIMENT

Figure 1:
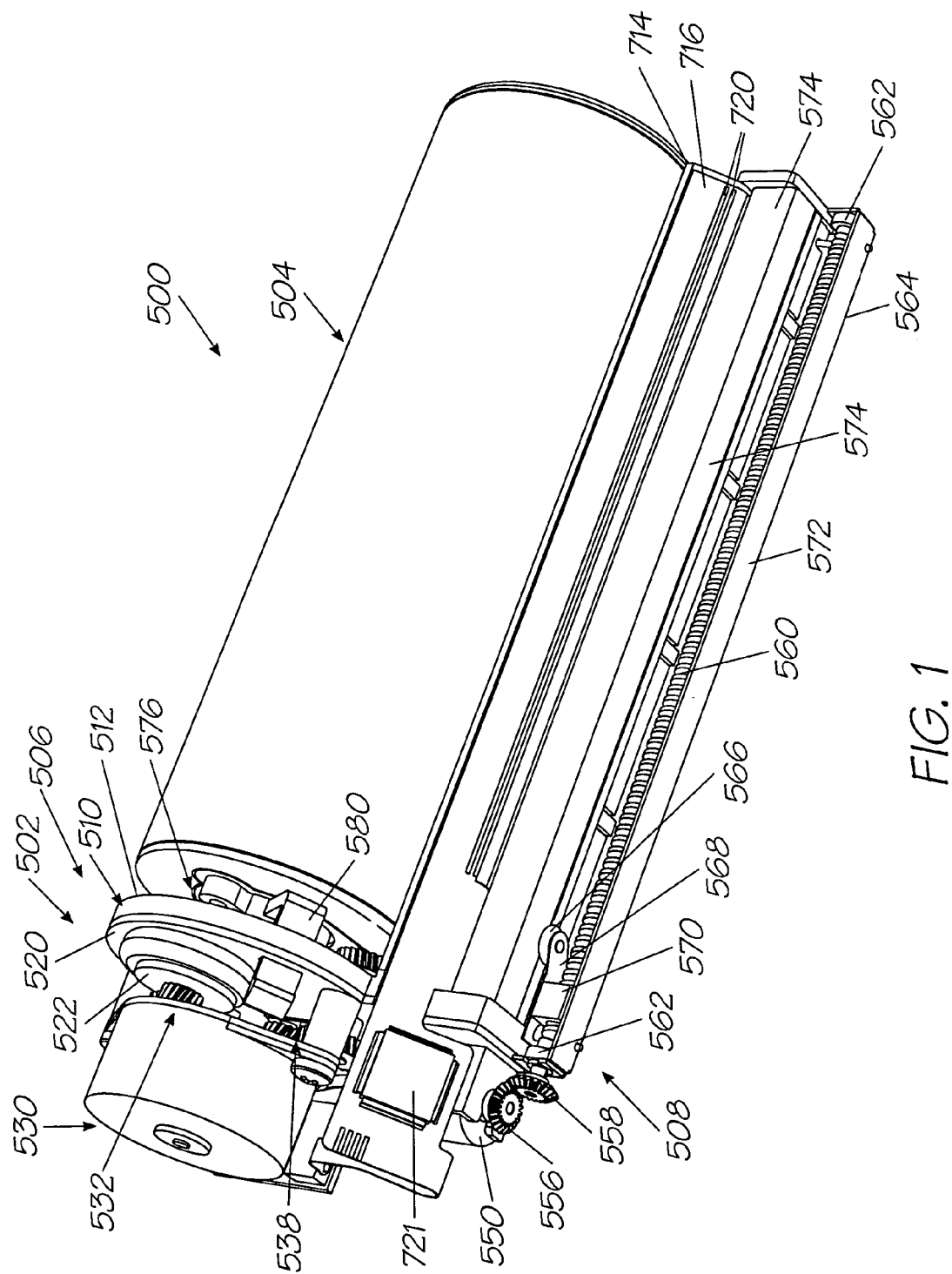
FIG. 1 shows a three dimensional view of a print engine, including components in accordance with the invention.
Figure 2:
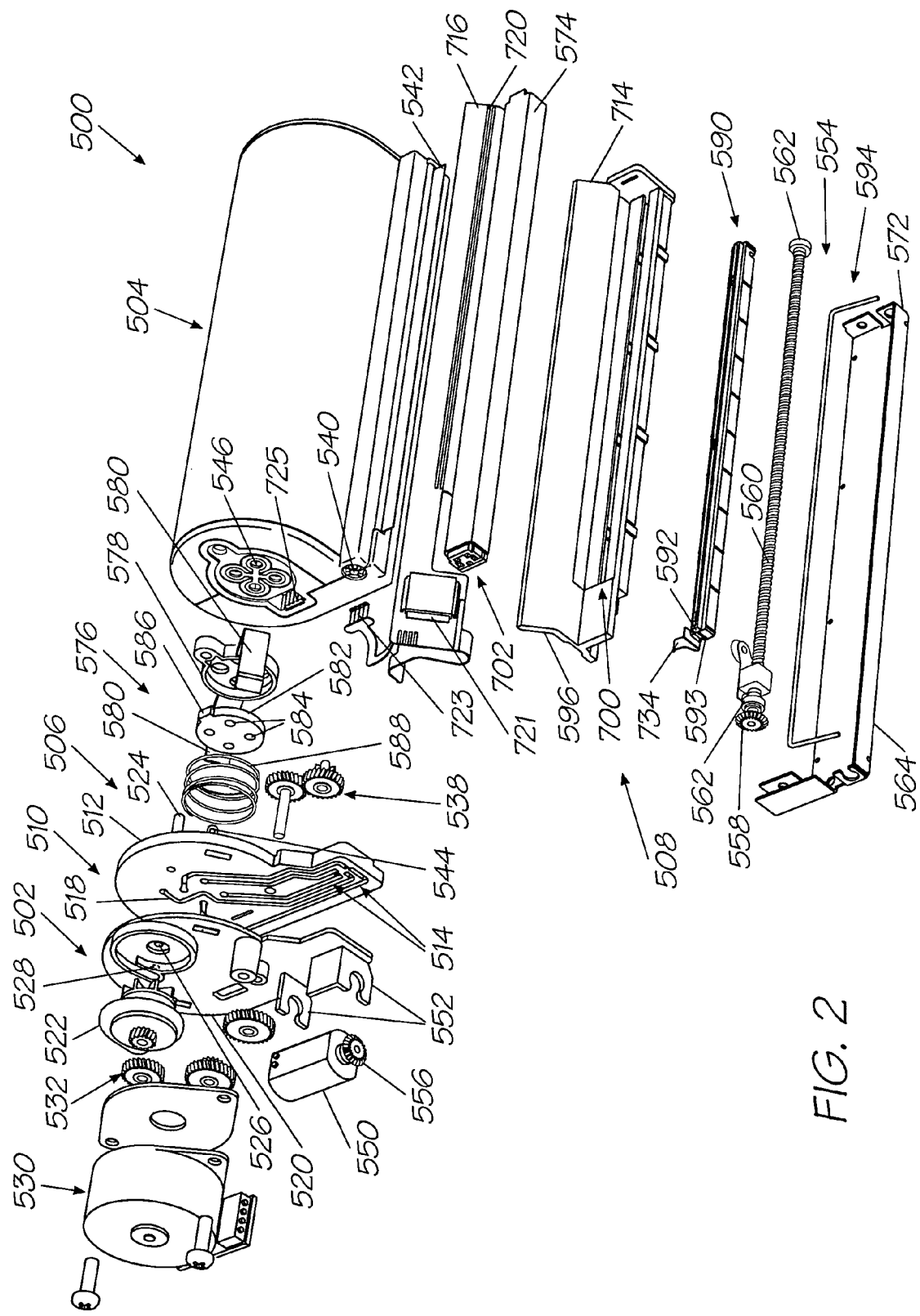
FIG. 2 shows a three dimensional, exploded view of the print engine.

In FIGS. 1 to 10 of the accompanying drawings, reference numeral 500 generally designates a print engine, in accordance with the invention. The print engine 500 includes a print engine assembly 502 on which a print roll cartridge 504 is removably mountable.

The print cartridge 504 is described in greater detail in our co-pending applications entitled "A Print Cartridge" and "An Ink Cartridge" filed as International Patent Application numbers PCT/AU00/00741 and PCT/AU00/00742 respectively, the contents of which are specifically incorporated herein by cross reference.

The print engine assembly 502 comprises a first sub-assembly 506 and a second, printhead sub-assembly 508.

The sub-assembly 506 includes a chassis 510. The chassis 510 comprises a first molding 512 in which ink supply channels 514 are molded. The ink supply channels 514 supply inks from the print cartridge 504 to a printhead 516 (FIGS. 5 to 7) of the printhead sub-assembly 508. In the preferred embodiment, the printhead 516 prints in four colors or three colors plus ink which is only visible in the infrared spectrum (hereinafter referred to as 'infrared ink'). Accordingly, four ink supply channels 514 are defined in the molding 512 together with an air supply channel 518. The air supply channel 518 supplies air to the printhead 516 to inhibit the build up of foreign particles on a nozzle guard of the printhead 516.

The chassis 510 further includes a cover molding 520 that supports a pump 522. The pump 522 is a suction pump, configured to draw air through an air filter in the print cartridge 504 via an air inlet pin 524 and an air inlet opening 526. Air is expelled through an outlet opening 528 into the air supply channel 518 of the chassis 510.

The chassis 510 further supports a first drive motor in the form of a stepper motor 530 that drives the pump 522 via a first gear train 532. The stepper motor 530 is also connected to a drive roller 534 (FIG. 5) of a roller assembly 536 of the print cartridge 504 via a second gear train 538. The gear train 538 engages an engageable element 540 (FIG. 2) carried at an end of the drive roller 534. The stepper motor 530 thus controls the feed of print media 542 to the printhead 516 of the sub-assembly 508 to enable an image to be printed on the print media 542 as it passes beneath the printhead 516. It also to be noted that, as the stepper motor 530 is only operated to advance the print media 542, the pump 522 is only operational to blow air over the printhead 516 when printing takes place on the print media 542.

The molding 512 of the chassis 510 also supports a plurality of ink supply conduits in the form of pins 544 which are in communication with the ink supply channels 514. The ink supply pins 544 are received through an elastomeric collar assembly 546 of the print cartridge 504 for drawing ink from ink chambers or reservoirs 548 (FIG. 5) in the print cartridge 504 to be supplied to the printhead 516.

A second motor 550, which is a DC motor, is supported on the cover molding 520 of the chassis 510 via clips 552. The motor 550 is provided to drive a separating means in the form of a cutter arm assembly 554 to part a piece of the print media 542, after an image has been printed thereon, from a remainder of the print media. The motor 550 carries a bevelled gear 556 on an output shaft thereof. The bevelled gear 556 meshes with a bevelled gear 558 carried on a worm gear 560 of the cutter assembly 554. The worm gear 560 is rotatably supported via bearings 562 in a chassis base plate 564 of the printhead sub-assembly 508.

The cutter assembly 554 includes a cutter wheel 566, which is supported on a resiliently flexible arm 568 on a mounting block 570. The worm gear 560 passes through the mounting block 570 such that, when the worm gear 560 is rotated, the mounting block 570 and the cutter wheel 566 traverse the chassis base plate 564. The mounting block 570 bears against a lip 572 of the base plate 564 to inhibit rotation of the mounting block 570 relative to the worm gear 560. Further, to effect cutting of the print media 542, the cutter wheel 566 bears against an upper housing or cap portion 574 of the printhead sub-assembly 508. This cap portion 574 is a metal portion. Hence, as the cutter wheel 566 traverses the capped portion 574, a scissors-like cutting action is imparted to the print media to separate that part of the print media 542 on which the image has been printed.

The sub-assembly 506 includes an ejector mechanism 576. The ejector mechanism 576 is carried on the chassis 510 and has a collar 578 having clips 580, which clip and affix the ejector mechanism 576 to the chassis 510. The collar 578 supports an insert 582 of an elastomeric material therein. The elastomeric insert 582 defines a plurality of openings 584. The openings 584 close off inlet openings of the pins 544 to inhibit the ingress of foreign particles into the pins 544 and, in so doing, into the channels 514 and the printhead 516. In addition, the insert 584 defines a land or platform 586 that closes off an inlet opening of the air inlet pin 524 for the same purposes.

Figure 3:
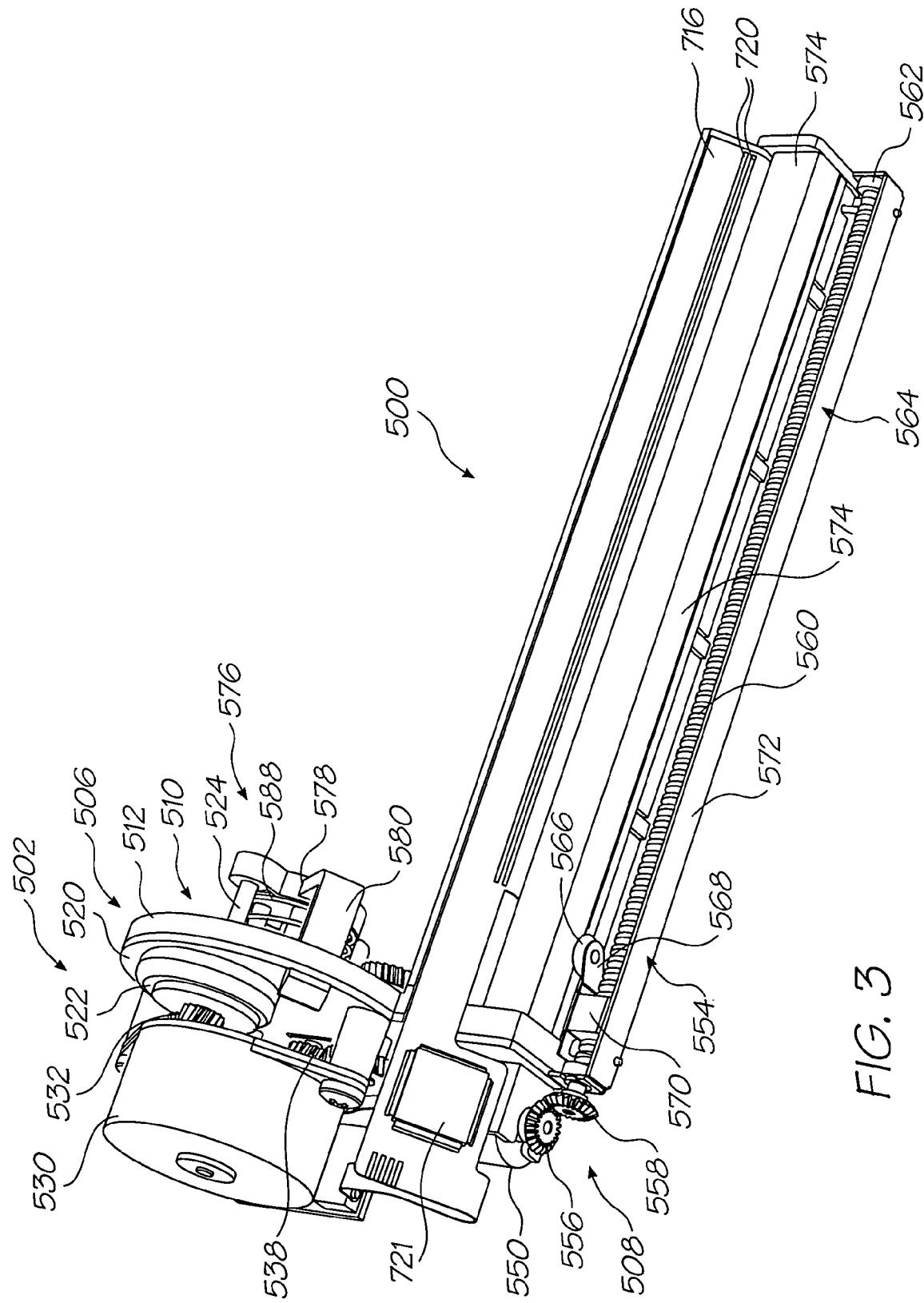
FIG. 3 shows a three dimensional view of the print engine with a removable print cartridge used with the print engine removed.
Figure 4:
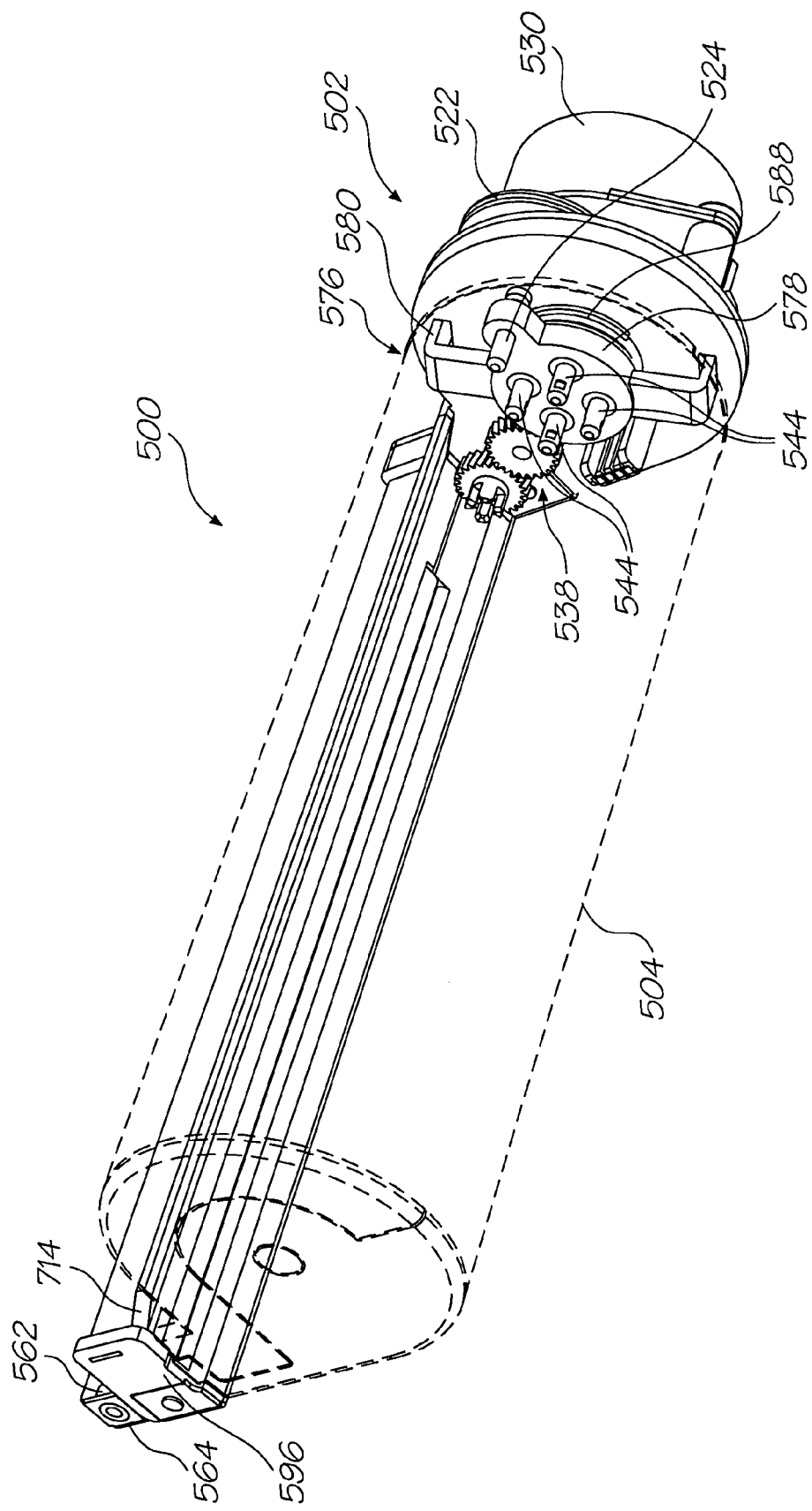
FIG. 4 shows a three dimensional, rear view of the print engine with the print cartridge shown in dotted lines.
Figure 5:
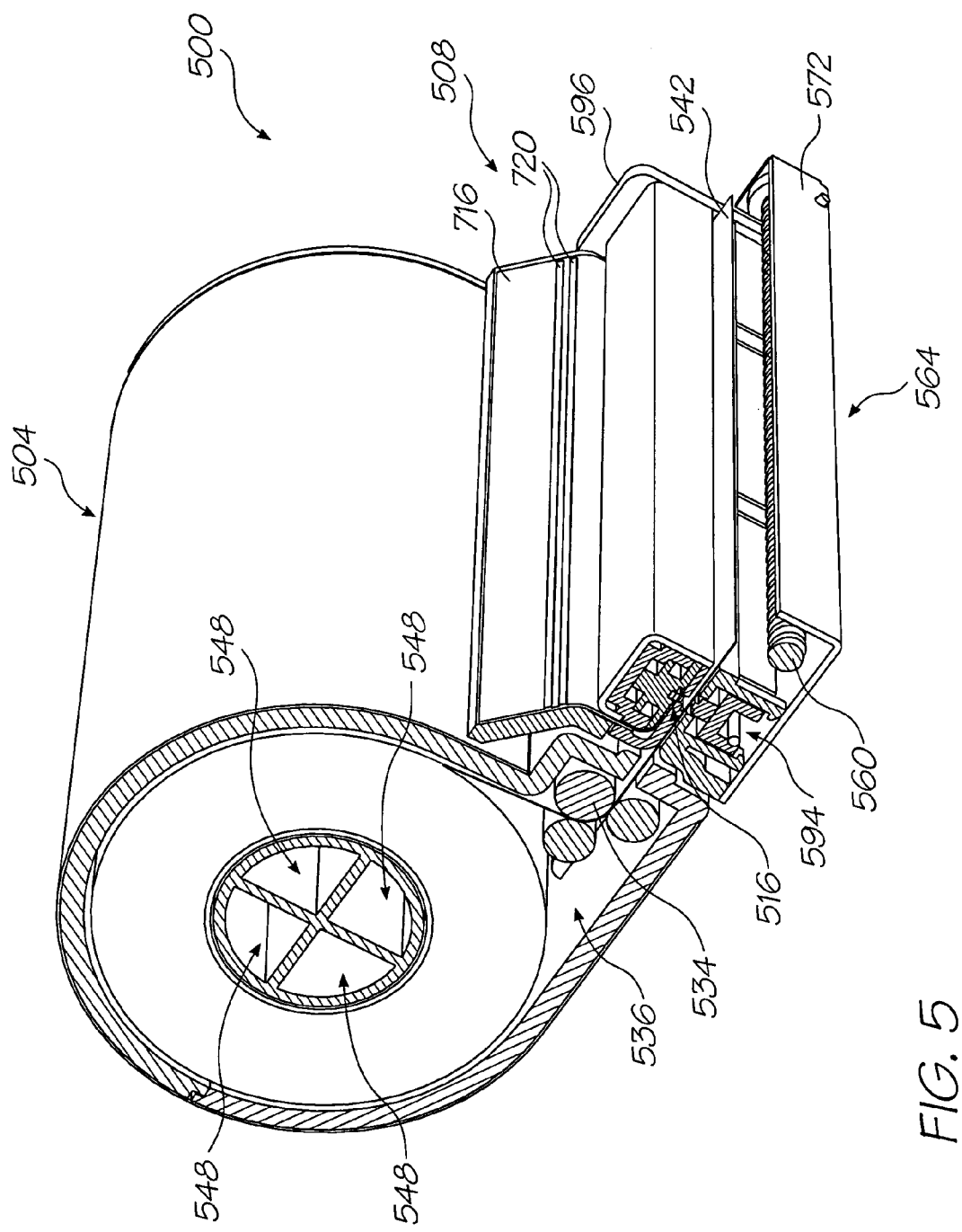
FIG. 5 shows a three dimensional, sectional view of the print engine.
Figure 6:
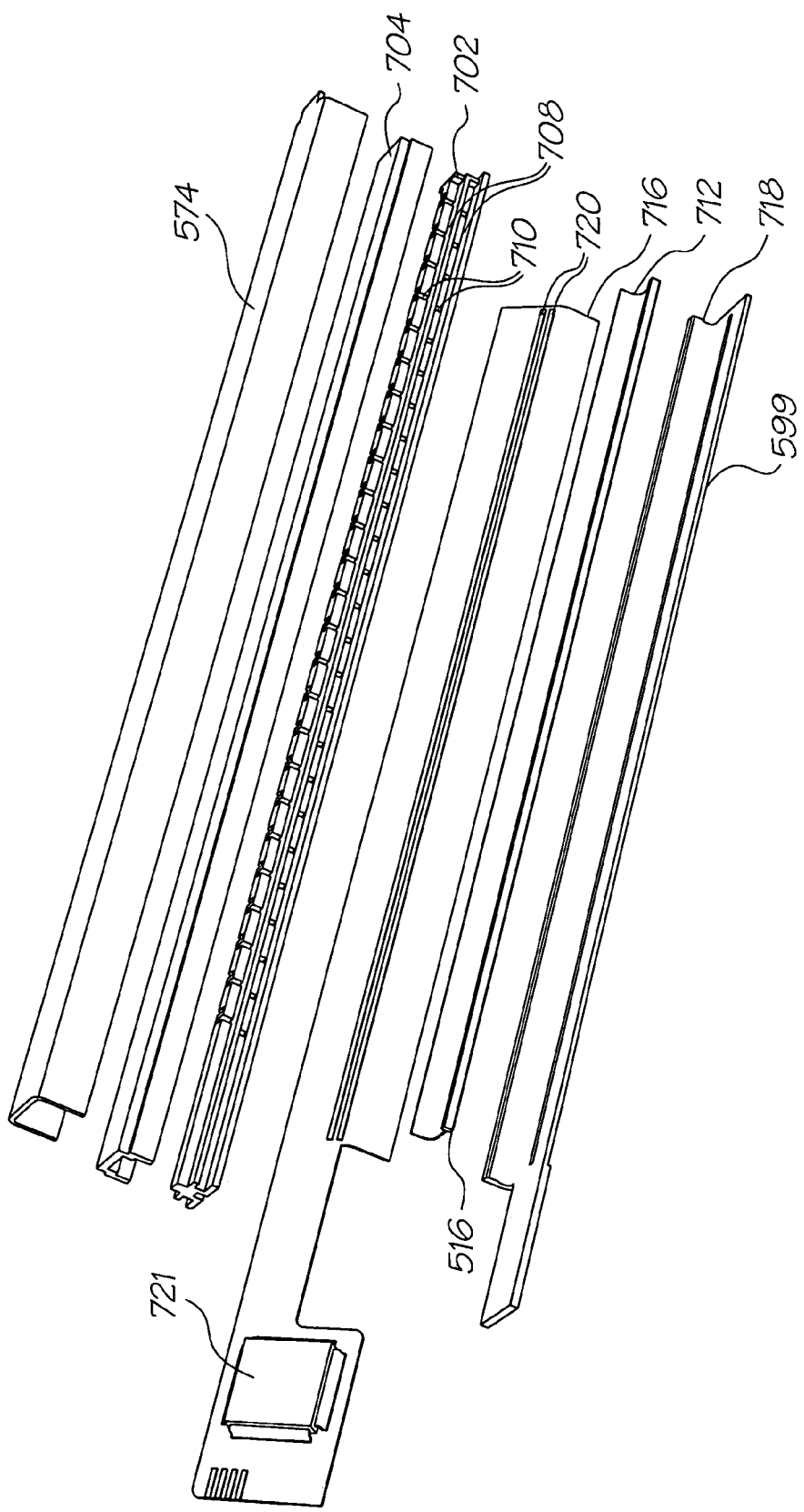
FIG. 6 shows a three dimensional, exploded view of a printhead sub-assembly of the print engine.

A coil spring 588 is arranged between the chassis 510 and the collar 578 to urge the collar 578 to a spaced position relative to the chassis 510 when the cartridge 504 is removed from the print engine 500, as shown in greater detail in FIG. 3 of the drawings. The ejector mechanism 576 is shown in its retracted position in FIG. 4 of the drawings.

The printhead sub-assembly 508 includes, as described above, the base plate 564. A capping mechanism 590 is supported displaceably on the base plate 564 to be displaceable towards and away from the printhead 516. The capping mechanism 590 includes an elongate rib 592 arranged on a carrier 593. The carrier is supported by a displacement mechanism 594, which displaces the rib 592 into abutment with the printhead 516 when the printhead 516 is inoperative. Conversely, when the printhead 516 is operational, the displacement mechanism 594 is operable to retract the rib 592 out of abutment with the printhead 516.

The printhead sub-assembly 508 includes a printhead support molding 596 on which the printhead 516 is mounted. The molding 596, together with an insert 599 arranged in the molding 596, defines a passage 598 through which the print media 542 passes when an image is to be printed thereon. A groove 700 is defined in the molding 596 through which the capping mechanism 590 projects when the capping mechanism 590 is in its capping position.

An ink feed arrangement 702 is supported by the insert 599 beneath the cap portion 574. The ink feed arrangement 702 comprises a spine portion 704 and a casing 706 mounted on the spine portion 704. The spine portion 704 and the casing 706, between them, define ink feed galleries 708 which are in communication with the ink supply channels 514 in the chassis 510 for feeding ink via passages 710 (FIG. 7) to the printhead 516.

An air supply channel 711 (FIG. 8) is defined in the spine portion 704, alongside the printhead 516.

Electrical signals are provided to the printhead 516 via a TAB film 712, which is held captive between the insert 599, and the ink feed arrangement 702.

The molding 596 includes an angled wing portion 714. A flexible printed circuit board (PCB) 716 is supported on and secured to the wing portion 714. The flex PCB 716 makes electrical contact with the TAB film 712 by being urged into engagement with the TAB film 712 via a rib 718 of the insert 599. The flex PCB 716 supports busbars 720 thereon. The busbars 720 provide power to the printhead 516 and to the other powered components of the print engine 500. Further, a camera print engine control chip 721 is supported on the flex PCB 716 together with a QA chip (not shown) which authenticates that the cartridge 504 is compatible and compliant with the print engine 500. For this purpose, the PCB 716 includes contacts 723, which engage contacts 725 in the print cartridge 504.

Figure 7:
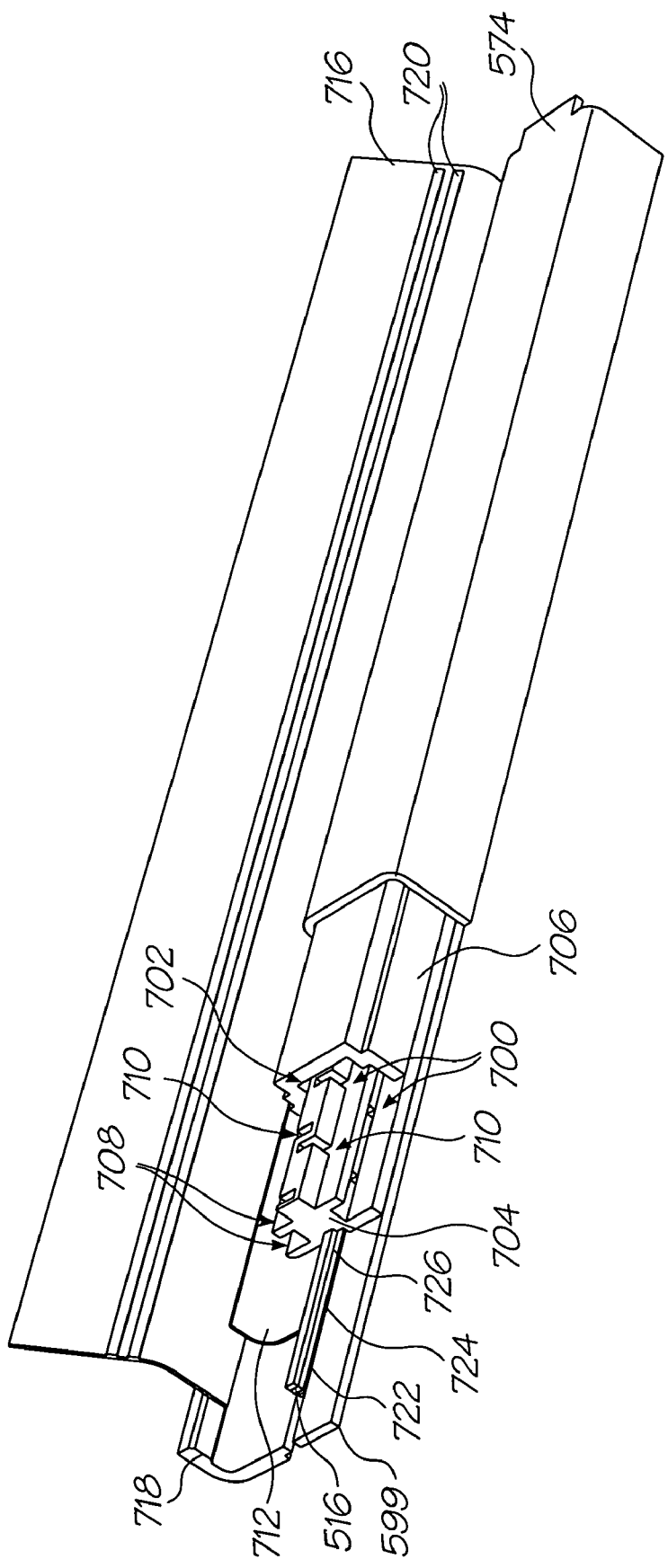
FIG. 7 shows a partly cutaway view of the printhead sub-assembly.
Figure 8:
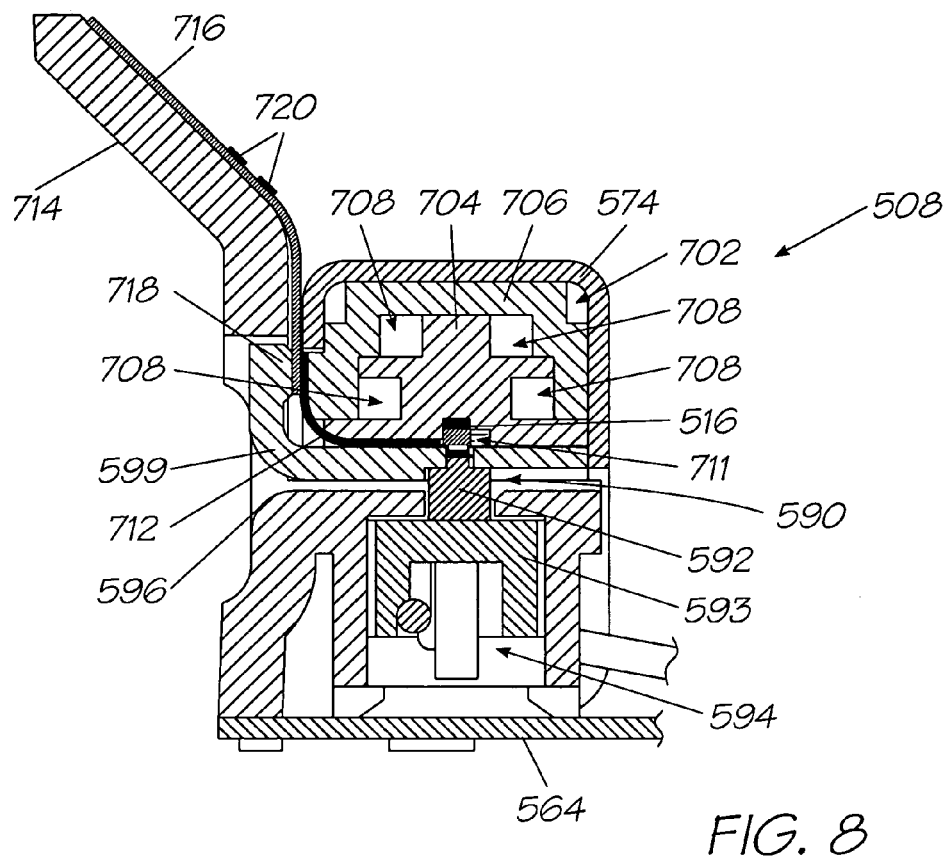
FIG. 8 shows a sectional end view of the printhead sub-assembly with a capping mechanism in a capping position.
Figure 9:
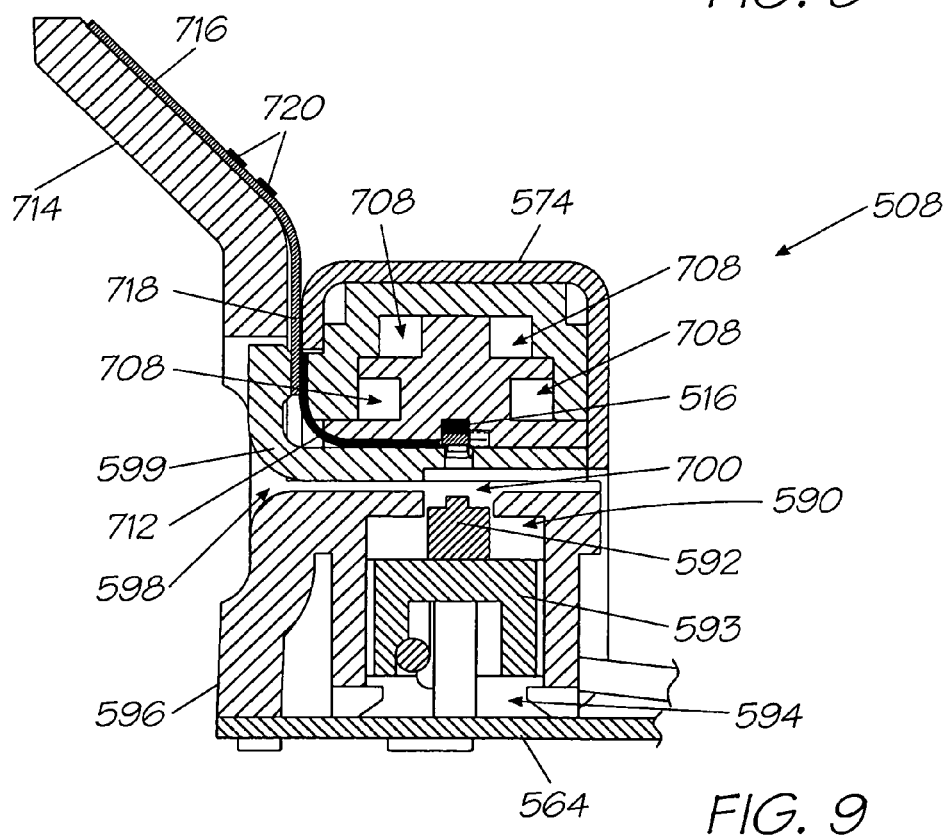
FIG. 9 shows the printhead sub-assembly with the capping mechanism in its uncapped position.

As illustrated more clearly in FIG. 7 of the drawings, the printhead itself includes a nozzle guard 722 arranged on a silicon wafer 724. The ink is supplied to a nozzle array (not shown) of the printhead 516 via an ink supply member 726. The ink supply member 726 communicates with outlets of the passages 710 of the ink feed arrangement 702 for feeding ink to the array of nozzles of the printhead 516, on demand.

Figure 10:
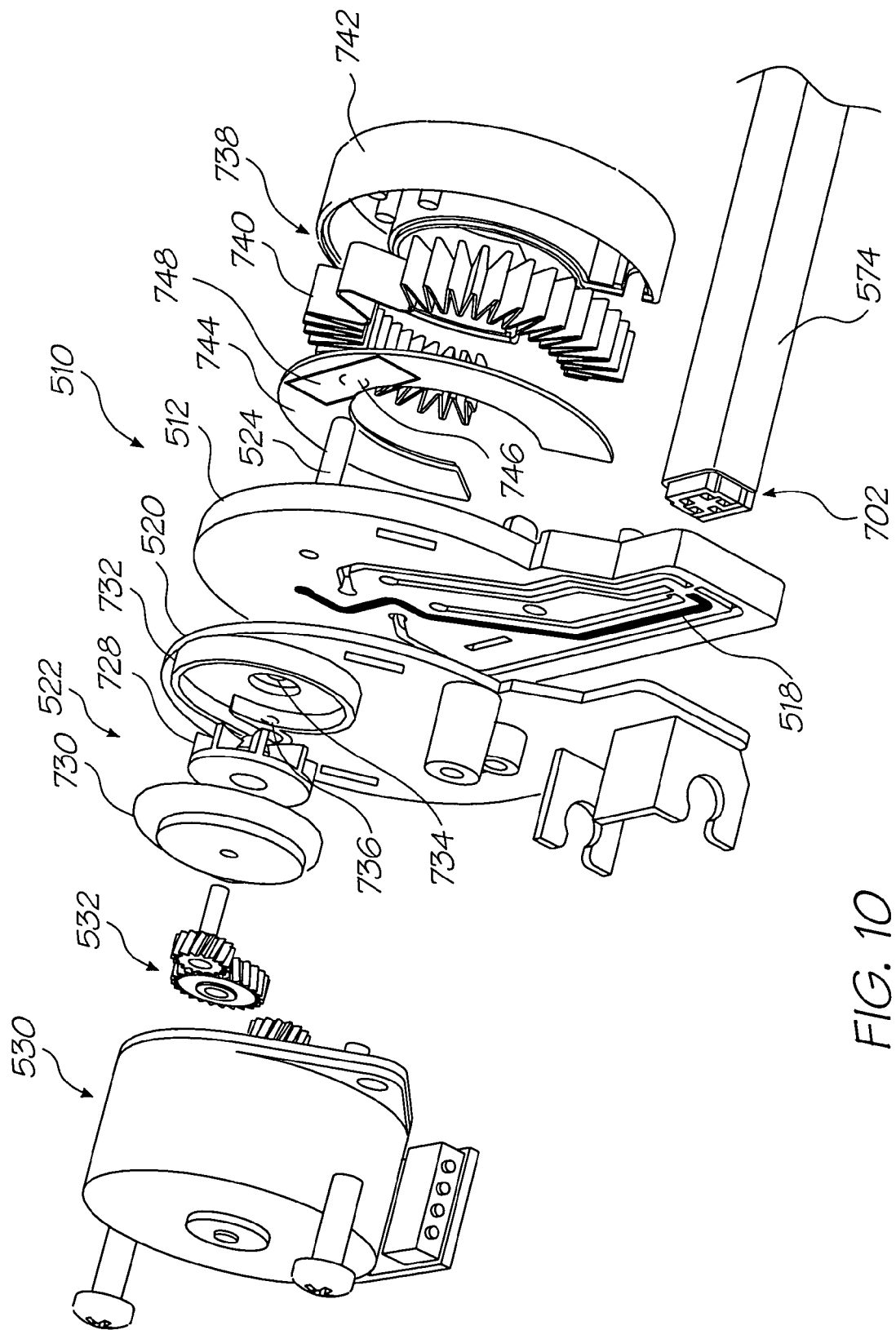
FIG. 10 shows an exploded, three dimensional view of an air supply arrangement of the print engine.

In FIG. 10, the air supply path for supplying air to the printhead 516 is shown in greater detail. As illustrated, the pump 522 includes an impeller 728 closed off by an end cap 730. The cover molding 520 of the chassis forms a receptacle 732 for the impeller 728. The cover molding 520 has the air inlet opening 734 and the air outlet opening 736. The air inlet opening 734 communicates with the pin 524. The air outlet opening 736 feeds air to the air supply channel 518, which, in FIG. 10, is shown as a solid black line. The air fed from the air supply channel 518 is blown into the printhead 516 to effect cleaning of the printhead. The air drawn in via the pump 522 is filtered by an air filter 738, which is accommodated in the print cartridge 504. The air filter 738 has a filter element 740 which may be paper based or made of some other suitable filtering media. The filter element 740 is housed in a canister, having a base 742 and a lid 744. The lid 744 has an opening 746 defined therein. The opening 746 is closed off by a film 748, which is pierced by the pin 524. The advantage of having the air filter 738 in the print cartridge 504 is that the air filter 738 is replaced when the print cartridge 504 is replaced.

It is an advantage of the invention that an air pump 522 is driven by the stepper motor 530, which also controls feed of the print media to the printhead 516. In so doing, fewer components are required for the print engine 500 rendering it more compact. In addition, as the same motor 530 is used for operating the air pump 522 and for feeding the print media 542 to the printhead 516, fewer power consuming components are included in the print engine 500 rendering it more compact and cheaper to produce.

It is also to be noted that, in order to make the print engine 500 more compact, the size of the print engine assembly 502 is such that most of the components of the assembly 502 are received within a footprint of an end of the print cartridge 504.

Figure 11:
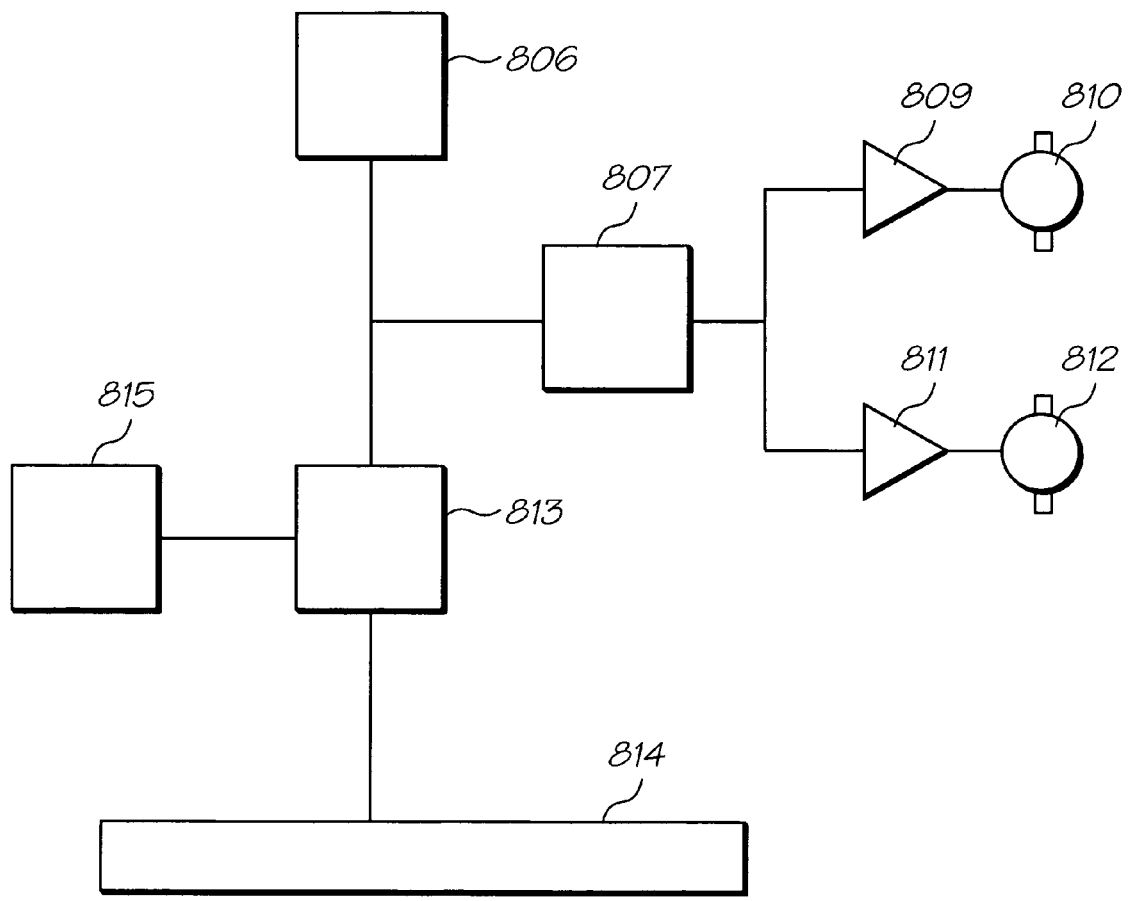
FIG. 11 is a schematic block diagram of components incorporated into a telescope having a built-in printer.

In FIG. 11 there is schematically depicted in block diagram form the key internal components of a telescope having an internal printer. The printer would typically utilize a monolithic printhead 814 which could be the same as described above with reference to FIGS. 1 to 10, but could alternatively be another compact printhead capable of printing on photograph-sized print media. An image sensor 806 receives images from a lens 802 (FIG. 12) of the telescope. Image data from the image sensor 806 is fed to a print engine controller 813 that controls the printhead 814. A memory 815 is associated with the print engine controller and stores an image memory. This image memory might be stored upon depression of a trigger 817 for example.

A micro-controller 807 associated with the image sensor and print engine controller controls a motor driver 809, which in turn drives a media transport device 810. This might be the same as stepper motor 530 described earlier.

The micro-controller 807 also controls a motor driver 811 which in turn controls a guillotine motor 812 to sever a printed sheet from an in-built roll of print media after an image is printed. A sheet being driven by media transport device 810 is shown in dotted lines at 816 in FIG. 12. The guillotine might be of the form of cutter wheel 566 described earlier.

Figure 12:
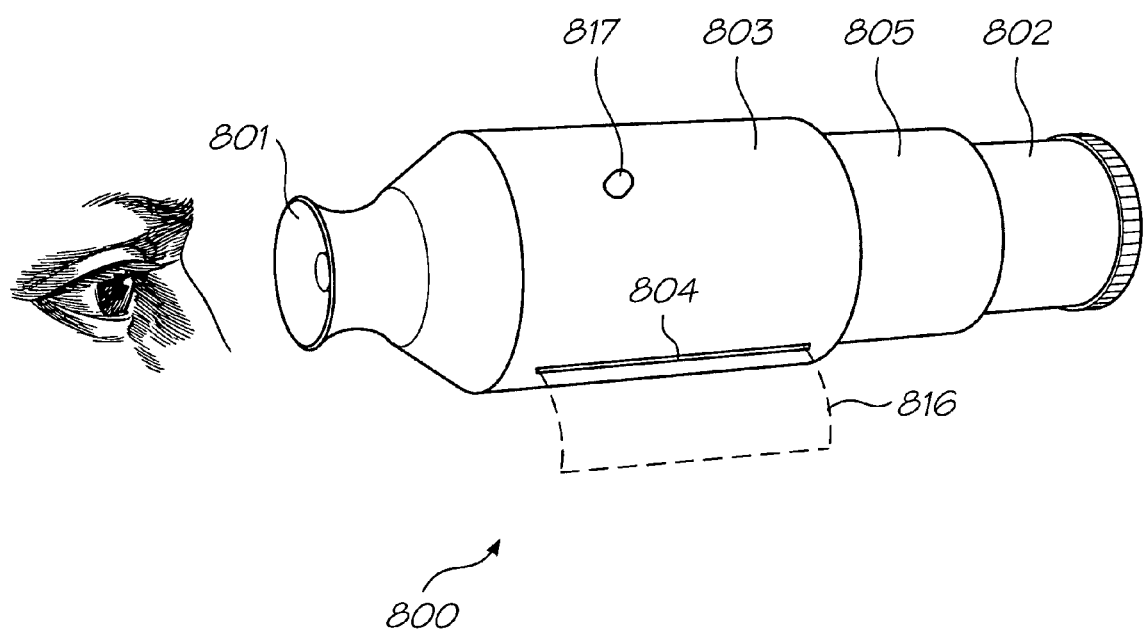
FIG. 12 is a schematic perspective view of a telescope having an in-built printer.

FIG. 12 depicts a particular embodiment of a telescope 800 incorporating an in-built printer. The telescope 800 includes a printer body portion 803 from which there extends telescopic lens components 802 and 805. Component 802 might rotate with respect to component 805 to effect extension or retraction of the telescope for focusing on an object. An image sensor is provided within portion 805 and relays information electronically to an eyepiece 801 in which there is provided an electronic display unit. That is, the printer is located between the image sensor and the display unit. The printer body portion 803 includes a slot 804 through which paper 816 having an image printed thereon can be dispensed. A trigger 817 can be positioned on the body portion 803 or any other part of the telescope to initiate a printing operation.

In use, a person holding the telescope 800 would use eyepiece 801 to view a remote object. When ready, the trigger 817 can be depressed to activate the print engine controller to print an image stored in memory 815. This would in turn activate the micro-controller 807 to activate the media transport 810 and guillotine 812. A printed image 816 having passed out of slot 804 would then be available as a permanent record.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

The invention claimed is:

1. A portable telescope assembly comprising:
   one or more telescopic lens components;
   an image sensor mounted within the one or more telescopic lens components and configured to capture images formed within the one or more telescopic lens components;
   an eyepiece including an electronic display in communication with the image sensor for displaying said images;
   an internal printer mounted in a tubular body between the one or more telescopic lens components and the eyepiece and operatively connected to the image sensor to print the captured images on print media;
   a media transport and cutting device operatively arranged with respect to the internal printer; and
   controllers mounted in the telescope and configured to control the operation of the image sensor and the printer.

2. A portable telescope assembly as claimed in claim 1, wherein the controllers comprise:
   a first micro-controller configured to control operation of the image sensor; and
   a second micro-controller configured to control operation of the media transport and cutting device.

3. A portable telescope assembly as claimed in claim 2, wherein the media transportation means comprises:
   a pair of motor drivers each coupled to the second controller; and
   a pair of motors which are each driven by a respective one of the motor drivers.

4. A portable telescope assembly as claimed in claim 3, wherein one of the motors is coupled to a platen or roller which is arranged to engage with and transport the media, and the other one of the motors is coupled to a guillotine which is arranged to sever the media.

5. A portable telescope assembly as claimed in claim 1, further comprising a memory device configured to store the captured images.

6. A portable telescope assembly as claimed in claim 1, wherein the printer comprises a print cartridge in which a roll of the print media is provided.

* * * * *